Patented Nov. 30, 1948

2,455,054

UNITED STATES PATENT OFFICE 2,455,054

WATER DISPERSIBLE PHENOTHIAZINE AND METHOD OF PRODUCING SAME

Lyle M. Geiger, Edgewood, and Donald L. Marsh, Avalon, Pa., assignors to The Neville Company, Neville Island, Pa., a corporation of Pennsylvania No Drawing. Application October 24, 1946, Serial No. 705,478

8 Claims. (Cl. 167—53)

This invention relates to water dispersible phenothiazine and to the method of producing the same, as well as to aqueous dispersions thereof.

Phenothiazine (thiodiphenylamine) has heretofore been proved to be a very effective anthelmintic for the internal treatment of such animals as horses, cattle, sheep, swine, poultry, and possibly others. For such use it is highly desirable to administer the phenothiazine in the form of a free flowing aqueous dispersion containing about 40% by weight of finely powdered phenothiazine. Great difficulty has been encountered in the past in economically producing satisfactory aqueous dispersions of finely powdered phenothiazine. The difficulty is due to the fact that phenothiazine powder as produced in accordance with prior art teachings is not wettable by water even when such powder is vigorously mixed with water for many hours.

The existence of this problem has brought forward several proposals having as their object the preparation of so-called "drench" grade phenothiazine, that is a satisfactory aqueous suspension of phenothiazine. One of these proposals entailed the employment of a type of explosive tablet containing a mixture of phenothiazine, sodium carbonate, and a weak organic acid such as citric acid or tartaric acid. These tablets have been produced with the hope that they would facilitate a formation of satisfactory aqueous dispersions of phenothiazine. Such tablets have not proved very satisfactory, and furthermore they are quite costly to manufacture.

Another prior art proposal recognizes that phenothiazine powder having a hydro-phobic character is not wettable by water and suggests the preparation of an aqueous suspension of phenothiazine powder through the use of small quantities of surface tension depressing agents added to the water. The surface tension depressing agent causes a decrease in the surface tension of the water after immersion of the phenothiazine powder, permitting it to become wetted and dispersed in the aqueous medium. Such surface tension depressing agents as sodium lauryl sulfate, esters of sodium sulfosuccinate, sodium alkyl naphthalene sulfonates, sodium alkyl aryl sulfonates, and polyglycols have been suggested. This procedure, while a step in the right direction, generally yields a product of unsatisfactory behavior in that it yields a nonflowing, settling, and lumpy slurry. It has been attempted to overcome this difficulty through the addition of still another type of agent to the suspension, namely a stabilizer in the form of a hydrophilic clay such as bentonite or vegetable gums and the like, including colloids such as gelatin and casein. Where employed, these stabilizers, however, have been used in amounts equal to at least one and sometimes as much as 8 parts for each 100 parts by weight of phenothiazine. The introduction of these stabilizers or modifiers results in a reduced efficiency of the anthelmintic action of the phenothiazine, so that a given weight of the final product contains less of the active agent than is desirable. Additionally, the dispersions so far have been found to be somewhat lumpy, foamy, and to show considerable settling and quite unsatisfactory flow properties.

The prior art procedures are furthermore cumbersome and expensive, requiring special blending technique and additional bulky equipment, such as internal drum mixers. Furthermore, the unavoidable double and triple handling of the dusty powdered phenothiazine possessing certain poisonous qualities materially increases the health hazard incident to the production of this product, and adds very appreciably to the cost price of "drench" grade phenothiazine.

Pursuant to the present invention, a dry, finely powdered, phenothiazine product that is readily wettable to produce aqueous suspensions can be economically obtained without the employment of special technique or additional cumbersome equipment.

In accordance with the present invention, the phenothiazine is so treated that the powdered phenothiazine carries appropriate amounts of a surface-active wetting agent and a peptizing agent, rendering the treated phenothiazine readily dispersible in an aqueous medium.

We have found that the most advantageous manner of treating the phenothiazine is to feed the phenothiazine lumps, to be disintegrated into powder, into an appropriate grinder along with a properly proportioned solution containing the surface-active wetting agent and the peptizing agent. Any conventional grinding equipment may be employed, such for example as hammer mills, ball mills, rod mills, or other type of pulverizer, in which solids can be ground and liquid simultaneously added. We have found an impact pulverizer, such as a hammer mill, to be particularly satisfactory. A continuous type pulverizer is to be preferred, since both the solid phenothiazine and the liquid solution can be fed simultaneously.

We have found that alkyl benzene alkali metal sulfonates constitute effective surface active wetting agents for employment in the process of treating phenothiazine. The higher alkylated benzene alkali metal sulfonates are more effective starting with the isopropyl benzene alkali metal sulfonates. Maximum activity, however, appears to be reached in such higher homologues as decyl, undecyl, and dodecyl derivatives. Decyl benzene sodium sulfonate, undecyl benzene sodium sulfonate, and dodecyl benzene sodium sulfonate have been used with marked success. The higher members of the series do not show effective surface activity due to their decreased solubility in water. The quantity of the surface active wetting agent varies somewhat, depending upon its character and effectiveness. When employing the more powerful surface active alkyl benzene alkali metal sulfonates, a quantity as low as 0.15% by weight of the phenothiazine treated has been found sufficient, whereas for some of the less active alkali metal sulfonates as much as 0.5% by weight of the phenothiazine treated may be required. An excess of the wetting agent, while wasteful, does not prevent the formation of a useful phenothiazine drench powder. When, however, too little of the wetting agent is employed, the phenothiazine powder lacks the requisite wetting qualities, and slurries formed therefrom do not possess the requisite desired qualities.

The peptizing agents which have been found effective for the treatment of phenothiazine include ammonia and water soluble derivatives thereof having the following general formula:

$$\begin{array}{c} R_1 \\ N-R_2 \\ R_3 \end{array}$$

in which R—1 is hydroxyl, hydroxy alkyl, aminoalkyl or part of a ring system with R—3; R—2 is hydrogen, alkyl or hydroxy alkyl, and R—3 is hydrogen, alkyl, hydroxy alkyl or part of a ring system with R—1. R—1 and R—3 are components parts of a ring system when connected together to form (with the nitrogen) a six-membered heterocyclic ring selected from the group consisting of oxazines and diazines.

All of the peptizing agents falling within this definition are effective. However, they are not equally desirable for addition to an anthelmintic preparation. Thus, ammonia, which gives off alkaline vapors, is not as desirable a peptizing agent as some of the other non-volatile odorless peptizers. It will also be appreciated that the physiological action and especially the toxicity of the peptizer govern its specific choice when taking the required doses to be administered to animals into account.

The quantity of the peptizing agent likewise depends to a considerable extent upon the activity and effectiveness thereof. Generally speaking, however, quantities below 0.5% by weight are satisfactory. Indeed, when employing an active peptizing agent, the addition of as little as 0.05% by weight of the phenothiazine treated in addition, of course, to the surface active wetting agent, yields a very satisfactory drench grade phenothiazine.

In carrying out the invention, the phenothiazine in lump form and a solution containing the selected surface active wetting agent and the selected peptizing agent, are introduced at rigidly controlled rates with respect to each other into an appropriate grinding and comminuting device so as to attain as the product a finely pulverized phenothiazine powder, carrying on the surface thereof the requisite proportions of the surface active wetting agent and peptizing agent. The precise particle size to which the phenothiazine powder is reduced is not critical. However, a typical analysis shows that 100% of the powder will pass a 40 mesh screen, 99.5% passes through a 200 mesh screen, and 94.5% passes through a 325 mesh screen.

The following Table I gives illustrative data for practicing the invention. In the table, column 1 identifies the examples. Column 2 gives the composition of the solution containing the wetting and peptizing agents. Column 3 gives the feed rates and ratios of the phenothiazine and solution fed to the hammer mill comminuting device. Column 4 shows the amount in percent by weight of the combined surface active wetting agent and peptizing agent present in the dried powdered product. Column 5 shows the break down of the composition of the powdered product, and Column 6 gives the relative viscosity for a 40% by weight dispersion of the dried, treated phenothiazine powder in water.

In the Table I the following is a definition of the symbols and abbreviations appearing therein;

| | |
|---|---|
| TEA | Triethanolamine |
| W. A. #1 | Dodecyl benzene sodium sulfonate |

$$\left( C_{12}H_{25}\!\!-\!\!\bigcirc\!\!-\!\!SO_3Na \right)$$

| | |
|---|---|
| H₂O | Water |
| W/A Soln. | Wetting agent and peptizer solution |
| W. A. #2 | Decyl benzene sodium sulfonate |

$$\left( C_{10}H_{21}\!\!-\!\!\bigcirc\!\!-\!\!SO_3Na \right)$$

| | |
|---|---|
| PhT | Phenothiazine |
| NF | National formulary |
| MEA | Monoethanolamine |

Table I

| (1) Example | (2) Comp. of W/A Solution | | | (3) Feed PhT Ratio W/A Soln. | (4) Per Cent W/A Solution by Weight | (5) Composition of Drench phT Per Cent by Weight | | (6) Relative Viscosity |
|---|---|---|---|---|---|---|---|---|
| | | Parts | Per Cent | | | | | |
| A | $(C_{12}H_{25}\text{—}⬡\text{—}SO_3Na)$ i. e.: dodecyl benzene sodium sulfonate | 1.2 | 15 | 1170 parts PhT 14.625 W/A Soln | $\frac{14.625}{1184.625} \times 100 = 1.235$ | PhT N. F. | 98.765 | 6.0 |
| | TEA | 2.0 | 25 | | | W. A. #1 | .185 | |
| | Water | 4.8 | 60 | | | TEA | .309 | |
| | Total | 8.00 | 100 | | | $H_2O$ | .741 | |
| | | | | | | | 100.000 | |
| B | W. A. #1 | 1.36 | 17 | 195 parts phT 2.5 parts W/A Soln | $\frac{2.5}{197.5} \times 100 = 1.265$ | PhT N. F. | 98.735 | 12.0 |
| | TEA | 1.20 | 15 | | | W. A. #1 | .215 | |
| | $H_2O$ | 5.44 | 68 | | | TEA | .190 | |
| | | 8.00 | 100 | | | $H_2O$ | .860 | |
| | | | | | | | 100.000 | |
| C | W. A. #1 | | 19 | 1170 parts phT 14.625 W/A Soln | 1.235 | PhT N. F. | 98.765 | 35.0 |
| | TEA | | 5 | | | W. A. #1 | .235 | |
| | $H_2O$ | | 76 | | | TEA | .062 | |
| | | | 100 | | | $H_2O$ | .938 | |
| | | | | | | | 100.000 | |
| D | W. A. #1 | | 15 | 1170 parts PhT 17.52 W/A Soln | 1.48 | PhT | 98.52 | 8.5 |
| | TEA | | 25 | | | W. A. #1 | 0.22 | |
| | $H_2O$ | | 60 | | | TEA | 0.37 | |
| | | | 100 | | | $H_2O$ | 0.89 | |
| | | | | | | | 100.00 | |
| E | W. A. #1 | | 13 | 1170 parts PhT 17.90 W/A Soln | 1.51 | PhT | 98.49 | 9.5 |
| | TEA | | 35 | | | W. A. #1 | 0.20 | |
| | $H_2O$ | | 52 | | | TEA | 0.53 | |
| | | | 100 | | | $H_2O$ | 0.78 | |
| | | | | | | | 100.00 | |
| F | W. A. #1 | | 10 | 1170 parts PhT 13.48 W/A Soln | 1.14 | PhT | 98.86 | too thick |
| | TEA | | 50 | | | W. A. #1 | 0.11 | |
| | $H_2O$ | | 40 | | | TEA | 0.57 | |
| | | | 100 | | | $H_2O$ | 0.46 | |
| | | | | | | | 100.00 | |
| G | W. A. #1 | | 10 | 1170 parts PhT 17.60 W/A Soln | 1.49 | PhT | 98.51 | 63.00 |
| | TEA | | 50 | | | W. A. #1 | .15 | |
| | $H_2O$ | | 40 | | | TEA | .75 | |
| | | | 100 | | | $H_2O$ | .59 | |
| | | | | | | | 100.00 | |
| H | W. A. #1 | | 15 | 1170 parts PhT 17.05 W/A Soln | 1.44 | PhT | 98.56 | 34.0 |
| | Monoethanolamine | | 25 | | | W. A. #1 | 0.22 | |
| | Water | | 60 | | | MEA | 0.36 | |
| | | | 100 | | | $H_2O$ | 0.86 | |
| | | | | | | | 100.00 | |
| I | $(C_{10}H_{21}\text{—}⬡\text{—}SO_3Na)$ i. e.: | | | 1170 parts PhT 14.625 W/A Soln | 1.235 | PhT | 98.765 | 20 |
| | W. A. #2 | | 15 | | | W. A. #2 | 0.185 | |
| | TEA | | 25 | | | TEA | 0.309 | |
| | Water | | 60 | | | $H_2O$ | 0.741 | |
| | | | 100 | | | | 100.000 | |

From the data in the above Table I, it will be observed that Examples A, B, D, E, H and I show unqualifiedly good results. Example C is illustrative of the lower limit for the triethanolamine content of the composition, since it will be observed that in this example the triethanolamine content of the composition represented only 0.062% and that the relative viscosity of the 40% by weight dispersion of the product in water was 35. Examples F and G are illustrative of the lower limit for the surface active wetting agent. In Example F, the composition contained only 0.11% of the specific wetting agent dodecyl benzene sodium sulfonate, and the 40% dispersion of the product in water, as noted was too thick. In Example G, the surface active wetting agent, i. e. dodecyl benzene sodium sulfonate, represented 0.15% of the final dry powdered composition, and the viscosity was 63.

The effectiveness of various suitable peptizing agents has been demonstrated by measurement of the flow properties of the 40% by weight dispersion of phenothiazine drench grade powder containing 0.2% by weight of dodecyl benzene sodium sulfonate as the surface active wetting agent and a similar amount of the selected peptizing agent. The flow properties were evaluated by measurement of the viscosity at 25° C. in an efflux type viscometer, and the viscosity is indicated in terms of relative viscosity by dividing the efflux time for the suspension by the efflux time for water under identical conditions. This is the manner in which the relative viscosity as indicated in Table I was also recorded. The effectiveness of the various peptizing agents is shown in the following Table II:

Table II

| Example No. | Peptizing Agent | Percentage by weight of Phenothiazine | Relative Viscosity @ 25° C. |
|---|---|---|---|
| 1 | Ammonia | 0.2 | 5.5 |
| 2 | Monoethanolamine | 0.2 | 5.5 |
| 3 | Diethanolamine | 0.2 | 6.0 |
| 4 | Triethanolamine | 0.2 | 7.0 |
| 5 | Ethylene diamine | 0.2 | 6.0 |
| 6 | 2 Amino—2 methyl 1 propanol | 0.2 | 5.0 |
| 7 | Morpholine | 0.2 | 6.5 |
| 8 | Piperazine | 0.2 | 2.0 |
| 9 | Pyridine | 0.2 | no flow |
| 10 | Blank | | no flow |

Examples 1 to 8 in Table II above are representative of the present invention, morpholine of Example 7 and piperazine of Example 8 being illustrative of oxazines and azines, respectively. The pyridine of Example 9 is not included in our definition of active peptizers and, as noted, was not effective in yielding a low viscosity slurry. In fact, the product of this example, like that of the blank of Example 10, forms a stiff paste which will not flow through the efflux viscometer.

While in the examples of Table I the surface active wetting agent was either dodecyl benzene sodium sulfonate or decyl benzene sodium sulfonate, other alkyl benzene alkali sulfonates have been employed with comparable good results. When using other surface wetting agents such as decyl benzene potassium sulfonate, undecyl benzene ammonium sulfonate, and the like, in combination with the active peptizing agents hereinbefore defined, the results achieved are uniformly good and comparable to those given in Table I above.

When operating within the prescribed limits, i. e. not less than 0.15% by weight of the surface active wetting agent and not less than 0.05% of an active peptizing agent, a dry powdered phenothiazine product is obtained which is completely dispersible in water, forming a perfectly stable, non-lumping, foamless, free-flowing and non-settling dispersion.

What is claimed is:

1. A water wettable, dry, powdered phenothiazine composition for use in preparing free-flowing, stable, aqueous suspensions, comprising at least 98 percent commercial phenothiazine, at least about 0.15% by weight of dodecyl benzene sodium sulfonate, and at least about 0.05% by weight of triethanolamine.

2. A water wettable, dry, powdered phenothiazine composition for use in preparing free-flowing, stable, aqueous suspensions, comprising phenothiazine, at least about 0.15% by weight of an alkyl benzene alkali metal sulfonate in which the alkyl substituent contains at least 3 carbon atoms, and at least about 0.05% by weight of a water soluble peptizing agent having the following general formula:

in which $R_1$ is selected from the group consisting of hydrogen, hydroxyalkyl, and aminoalkyl, $R_2$ and $R_3$ are selected from the group consisting of hydrogen and hydroxyalkyl, and in which $R_1$ and $R_3$ when connected together form a six-membered heterocyclic ring selected from the group consisting of oxazines and azines.

3. A water wettable, dry, powdered phenothiazine composition for use in preparing free-flowing, stable, aqueous suspensions, comprising at least 98% phenothiazine, at least about 0.15% by weight of an alkyl benzene alkali metal sulfonate in which the alkyl substituent contains from 3 to about 12 carbon atoms, and at least 0.05% by weight of a water-soluble peptizing agent having the following general formula:

in which $R_1$ is selected from the group consisting of hydrogen, hydroxyalkyl, and aminoalkyl, $R_2$ and $R_3$ are selected from the group consisting of hydrogen and hydroxyalkyl, and in which $R_1$ and $R_3$ when connected together form a six-membered heterocyclic ring selected from the group consisting of oxazines and azines.

4. A composition according to claim 3 in which the alkyl benzene alkali metal sulfonate is dodecyl benzene sodium sulfonate.

5. A composition according to claim 3 in which the alkyl benzene alkali metal sulfonate is decyl benzene sodium sulfonate.

6. A composition according to claim 3 in which the water-soluble peptizing agent is piperazine.

7. A free-flowing, stable, non-lumping, foamless, aqueous suspension of phenothiazine comprising water in a predominant amount, phenothiazine, at least about 0.15% by weight of the phenothiazine of an alkyl benzene alkali metal sulfonate in which the alkyl substituent contains at least 3 carbon atoms, and at least about 0.05% by weight of the phenothiazine of a water-soluble peptizing agent having the following general formula:

in which $R_1$ is selected from the group consisting of hydrogen, hydoxyalkyl, and aminoalkyl, $R_2$ and $R_3$ are selected from the group consisting of hydrogen and hydroxyalkyl, and in which $R_1$ and $R_3$ when connected together form a six-membered heterocyclic ring selected from the group consisting of oxazines and azines.

8. A process for producing a water wettable, dry powdered phenothiazine composition adapted for use in prepaing free-flowing, stable, aqueous suspensions, comprising disintegrating phenothiazine lumps in the presence of a minor amount of an aqueous solution containing at least about 0.15% by weight of the phenothiazine of a wetting agent consisting of an alkyl benzene alkali metal sulfonate in which the alkyl substituent contains at least 3 carbon atoms, and at least about 0.05% by weight of the phenothiazine of a water-soluble peptizing agent having the following general formula:

in which $R_1$ is selected from the group consisting of hydrogen, hydroxyalkyl, and aminoalkyl, $R_2$ and $R_3$ are selected from the group consisting of hydrogen and hydroxyalkyl, and in which $R_1$ and $R_3$ when connected together form a six-membered heterocyclic ring selected from the group consisting of oxazines and azines, so as to produce a finely pulverized phenothiazine powder having deposited on the surface thereof the wetting agent and the peptizing agent.

LYLE M. GEIGER.
DONALD L. MARSH.

REFERENCES CITED

The following references are of record in the file of this patent:

UNITED STATES PATENTS

| Number | Name | Date |
| --- | --- | --- |
| 2,255,694 | Beale | Sept. 9, 1941 |
| 2,294,888 | Austin | Sept. 8, 1942 |
| 2,407,486 | Flenner | Sept. 10, 1946 |

OTHER REFERENCES

Snell: Industrial and Engineering Chemistry, Volume 35, Jan. 1943, page 114.

U. S. Dispensatory, 23rd edition (1943), page 1533. (Copy in Division 43.)